(12) United States Patent
Batos-Parac et al.

(10) Patent No.: US 11,991,048 B2
(45) Date of Patent: May 21, 2024

(54) TOPOLOGY AND EVENT MONITORING SYSTEM

(71) Applicant: Accedian Networks Inc., Saint-Laurent (CA)

(72) Inventors: Adrian Petar Batos-Parac, Ottawa (CA); Yuen Ping Choi, Ottawa (CA); Steven Paul Glanzer, Stittsville (CA); Michael Andrew Preston, Ottawa (CA); Cameron Curtis Martin MacNeil, Ottawa (CA)

(73) Assignee: ACCEDIAN NETWORKS INC., Saint-Laurent (CA)

( * ) Notice: Subject to any disclaimer, the term of this patent is extended or adjusted under 35 U.S.C. 154(b) by 0 days.

(21) Appl. No.: 17/846,342

(22) Filed: Jun. 22, 2022

(65) Prior Publication Data

US 2022/0393948 A1 Dec. 8, 2022

Related U.S. Application Data

(63) Continuation of application No. 16/794,447, filed on Feb. 19, 2020, now Pat. No. 11,398,955.

(51) Int. Cl.
*H04L 41/14* (2022.01)
*H04L 41/12* (2022.01)
*H04L 43/045* (2022.01)
*H04L 43/0817* (2022.01)
*H04L 43/18* (2022.01)

(52) U.S. Cl.
CPC .............. *H04L 41/14* (2013.01); *H04L 41/12* (2013.01); *H04L 43/045* (2013.01); *H04L 43/0817* (2013.01); *H04L 43/18* (2013.01)

(58) Field of Classification Search
CPC ..... H04L 41/14; H04L 41/12; H04L 43/0817; H04L 43/18; H04L 43/045; H04L 12/24; H04L 12/26; H04L 41/5035; H04L 43/0811; H04L 43/50; H04L 43/091
See application file for complete search history.

(56) References Cited

U.S. PATENT DOCUMENTS

| 6,570,867 | B1 * | 5/2003 | Robinson | ............ H04L 41/0213 709/224 |
| 8,289,845 | B1 * | 10/2012 | Baldonado | ............... H04L 43/16 709/239 |
| 9,712,381 | B1 * | 7/2017 | Emanuel | ............. H04L 41/0645 |
| 10,791,421 | B1 * | 9/2020 | Rothschild | .......... G06F 16/9537 |

(Continued)

FOREIGN PATENT DOCUMENTS

| KR | 20190088343 A | 7/2019 |
| WO | 2014144520 A3 | 1/2015 |

(Continued)

*Primary Examiner* — Tonia L Dollinger
*Assistant Examiner* — Mehulkumar J Shah

(57) ABSTRACT

A method for locating performance problems in a network comprising associating one or more metadata to a plurality of monitored objects, collecting performance data from the plurality monitored objects to create a correlation of the performance data across two or more monitored objects matching predetermined set of metadata. Displaying said correlation on a map representing a plurality of devices, wherein said correlation can be used to isolate one or more devices impacting said performance data.

7 Claims, 17 Drawing Sheets

(56) References Cited

U.S. PATENT DOCUMENTS

| | | | |
|---|---|---|---|
| 10,848,402 B1 | 11/2020 | Haddow et al. | |
| 2005/0091356 A1* | 4/2005 | Izzo | H04L 41/0609 709/223 |
| 2013/0223218 A1* | 8/2013 | Vasseur | H04L 45/38 370/232 |
| 2014/0211636 A1 | 7/2014 | Robitaille | |
| 2014/0280810 A1 | 9/2014 | Gabrielson | |
| 2014/0379895 A1* | 12/2014 | Jain | H04L 41/0654 709/224 |
| 2015/0326457 A1* | 11/2015 | Wu | H04L 43/0811 370/252 |
| 2016/0020940 A1 | 1/2016 | Maltz et al. | |
| 2018/0048666 A1* | 2/2018 | Alderson | H04L 45/20 |
| 2018/0121032 A1* | 5/2018 | Naous | G06F 3/0482 |
| 2018/0309637 A1 | 10/2018 | Gill et al. | |
| 2021/0095971 A1 | 4/2021 | Mao et al. | |

FOREIGN PATENT DOCUMENTS

| | | |
|---|---|---|
| WO | 2015042171 A1 | 3/2015 |
| WO | 2015113036 A1 | 7/2015 |
| WO | 2018200756 A1 | 11/2018 |

\* cited by examiner

TOPOLOGY AND EVENT MONITORING SYSTEM

CROSS REFERENCE TO RELATED APPLICATION

This application is a continuation of U.S. patent application Ser. No. 16/794,447, filed Feb. 19, 2020, now allowed, which is incorporated herein by reference.

BACKGROUND

Network topology plays an important part in understanding network performance. Network Performance Monitoring (PM) data is used in combination to the topology to derive actionable insights to improve performance. PM data is almost always associated with some form of topology—either capturing metrics on data as it flows through a particular point in the network (i.e. flowmeter or passive capture or SNMP data from a router) or via a synthetic test session that generates metrics on packet flow between two points.

There is a need to leverage correlation of information to gain a broader understanding of how a network is behaving and where the devices affecting the performance are located.

BRIEF SUMMARY

In one embodiment of the invention, a method is disclosed for locating performance problems in a network comprising associating one or more metadata to a plurality of monitored objects, collecting one or more performance data from said plurality monitored objects, creating a correlation of said one or more performance data across two or more monitored objects matching predetermined set of metadata, displaying said correlation on a map representing a plurality of devices, wherein said correlation can be used to isolate one or more devices impacting said performance data.

In another embodiment, the devices are a conceptual device.

In another embodiment, a topology network analysis method is disclosed, comprising: monitoring one or more performance data of a plurality of monitored objects, analyzing said performance of said network using graph analytics of said performance data of said monitored object, visualizing on a graphical user interface a relative performance of a network device as compared to other of said network device.

In another embodiment, topology network analysis method further comprises showing the available paths between two network devices.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
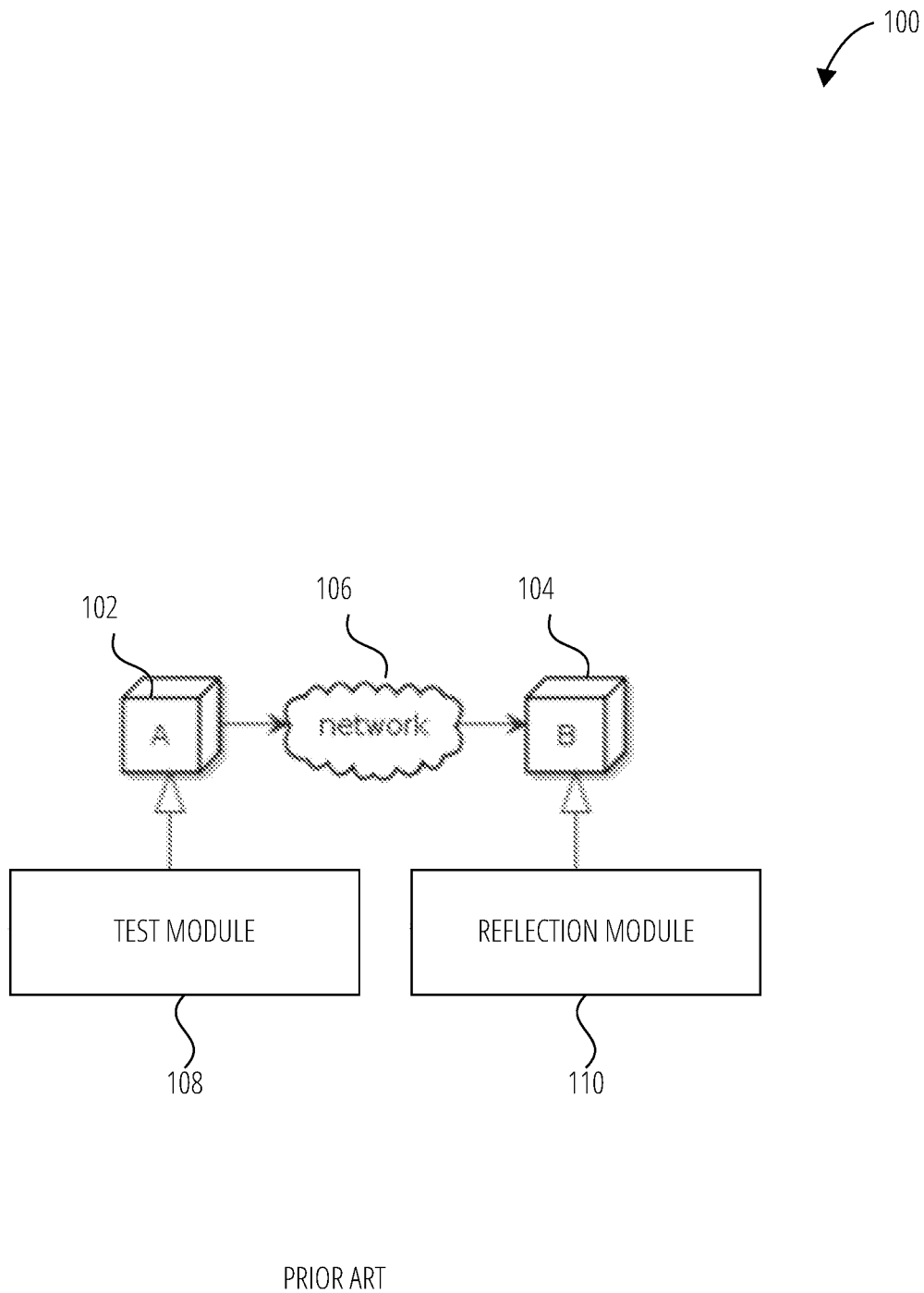
FIG. 1 illustrates a prior art network.

FIG. 1 depicts a network testing set up as per existing art. A test module 108 performs test packet injection to a first network device 102, the test packets are sent to a second network device 104 via a network and transmitted to a reflection module 110 that generates a reflection packet and sends the reflection packet back to the test module 108 via the second network device 104, the network 106 and the first network device 102. The test module 108 and the reflection module 110 analyze data contained in the test packet to evaluate the performance of the network path between the first network device 102 and the second network device 104.

The term monitored objects used herein refers to, but not limited to, a test session, an SNMP router interface or any point in the network that performance data can be collected. In this example, the monitored object is the test session between the first and second device.

Figure 2:
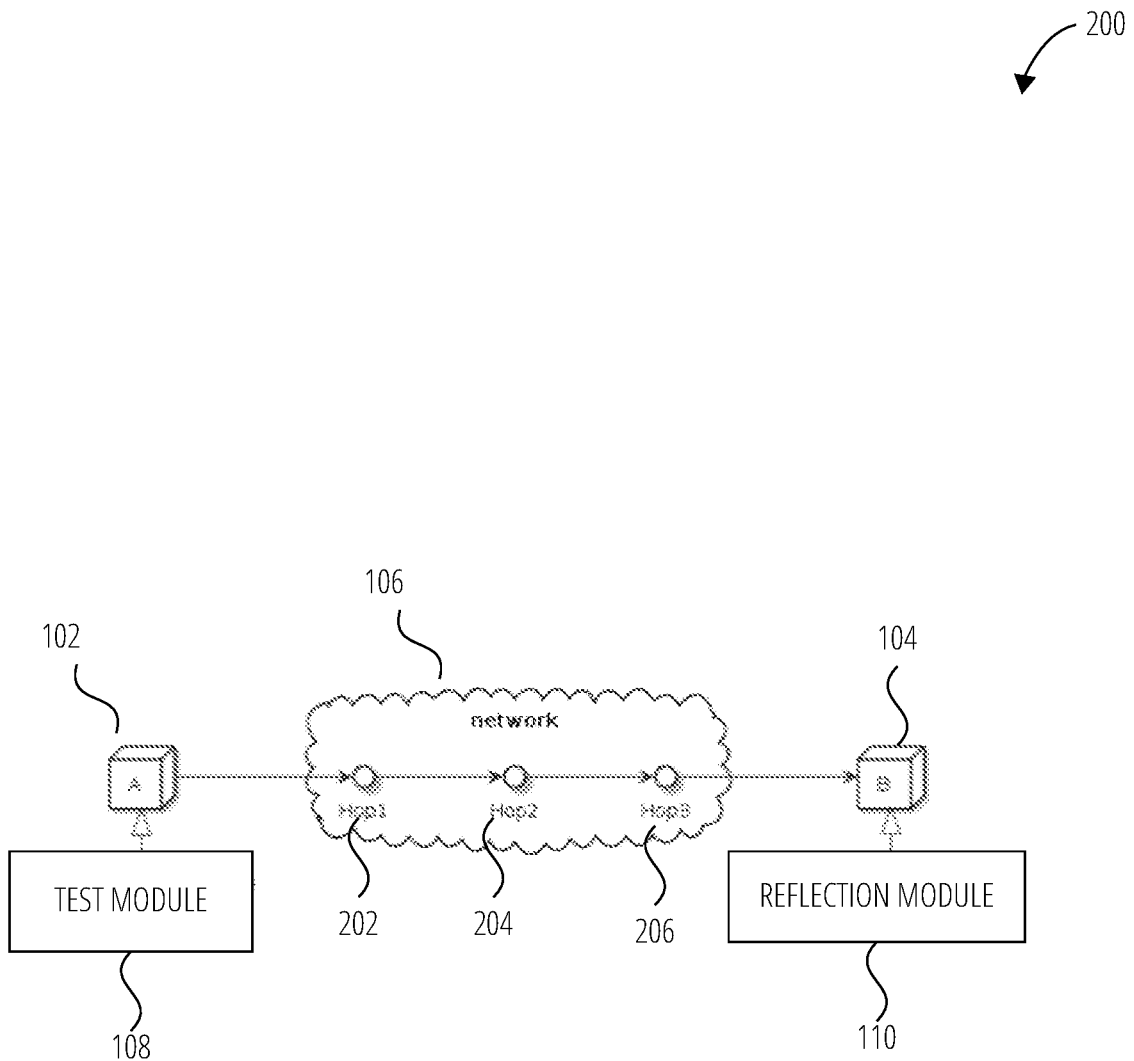
FIG. 2 illustrates a network with a path containing 3 hops.

FIG. 2 depicts how the network 106 comprises multiple hops (e.g. network devices or conceptual network path) and in this case the network path between the first network device 102 and the second network device 104 comprises a first network hop 202, a second network hop 204 and a third network hop 206. It should be understood that a network path can have any number of hops. In order to evaluate the performance of the network path it would be useful to have visibility of all the hops and different monitored objects at each hop in the path to assess where the performance issues arise.

Figure 3:
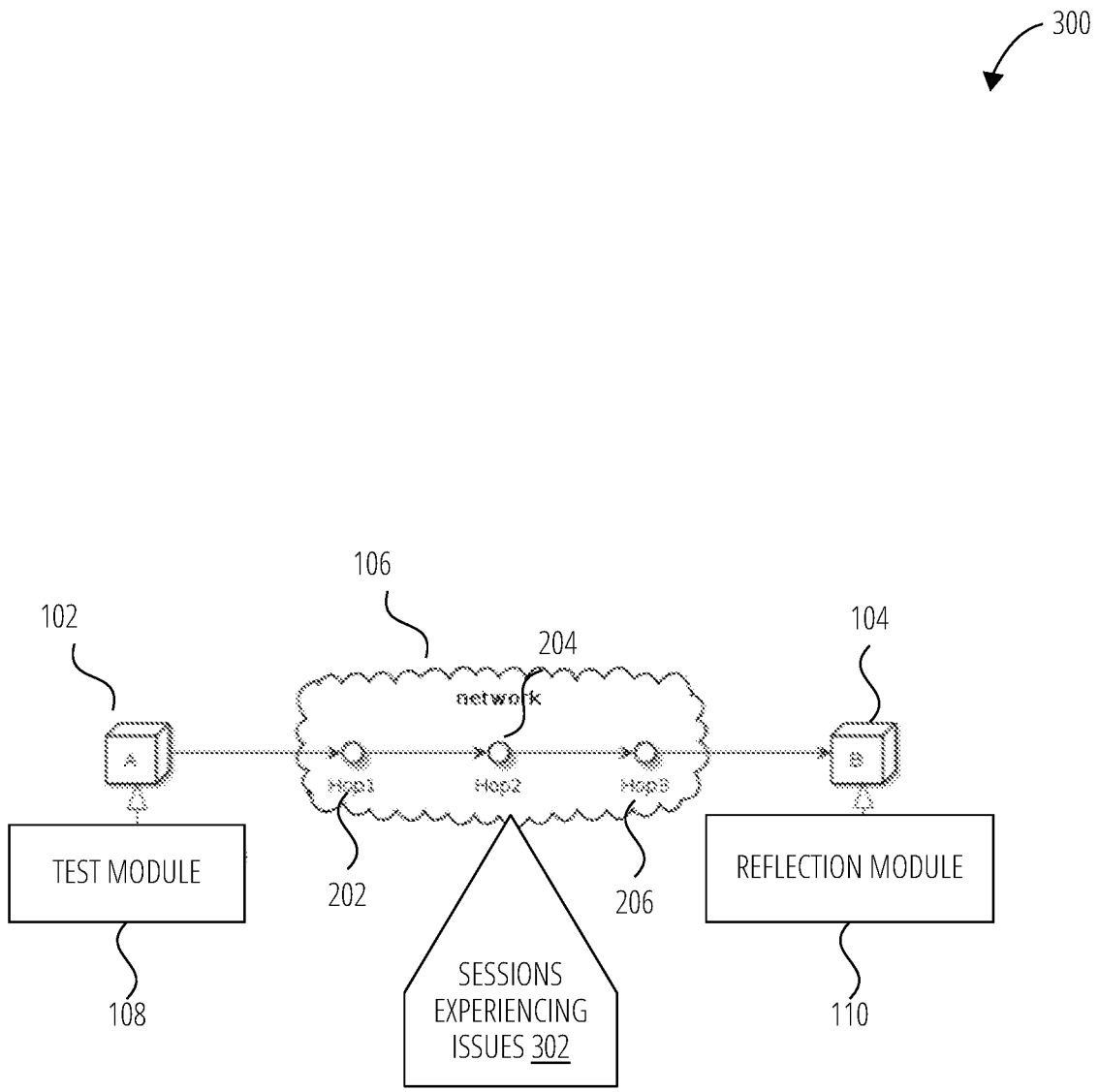
FIG. 3 illustrates a network with a path containing 3 hops and sessions experiencing a performance issue.

FIG. 3 gives an example where the second network hop 204 has several monitored objects experiencing issues 302. The sessions may be originating and terminating on different network devices, but their network path share the second network hop 204. It would be useful to have the understanding of the sessions experiencing issues 302 on a network hop, such that the network operator can take appropriate actions to fix the performance problems.

Figure 4:
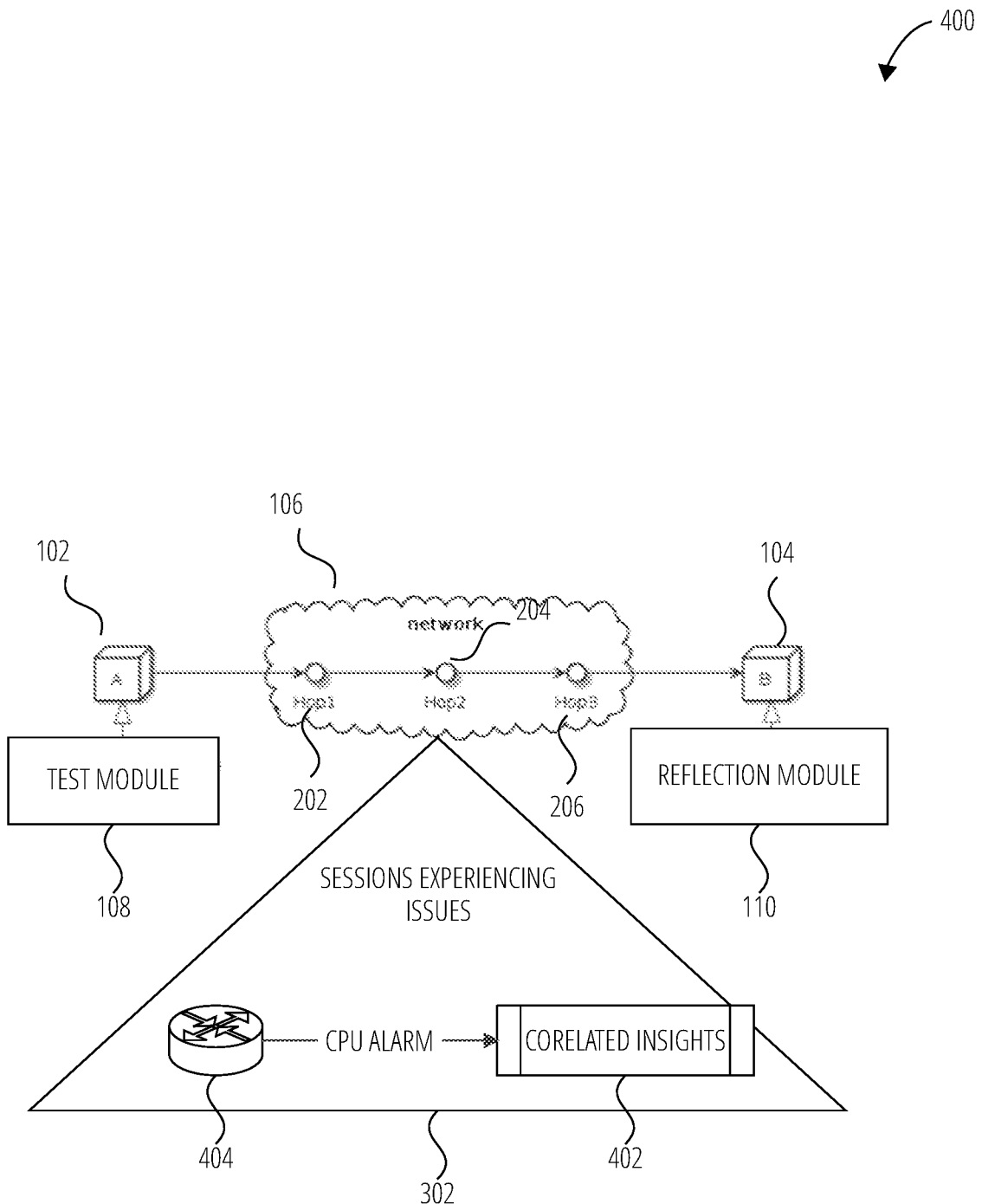
FIG. 4 illustrates correlation of information to identify the performance issue.

FIG. 4 shows how the second network hop 204 can generate alarms via a monitored object to provide data on performance issues and the data is correlated to the performance monitoring results to give the network operator additional insight on how to fix the performance issue.

Figure 5:
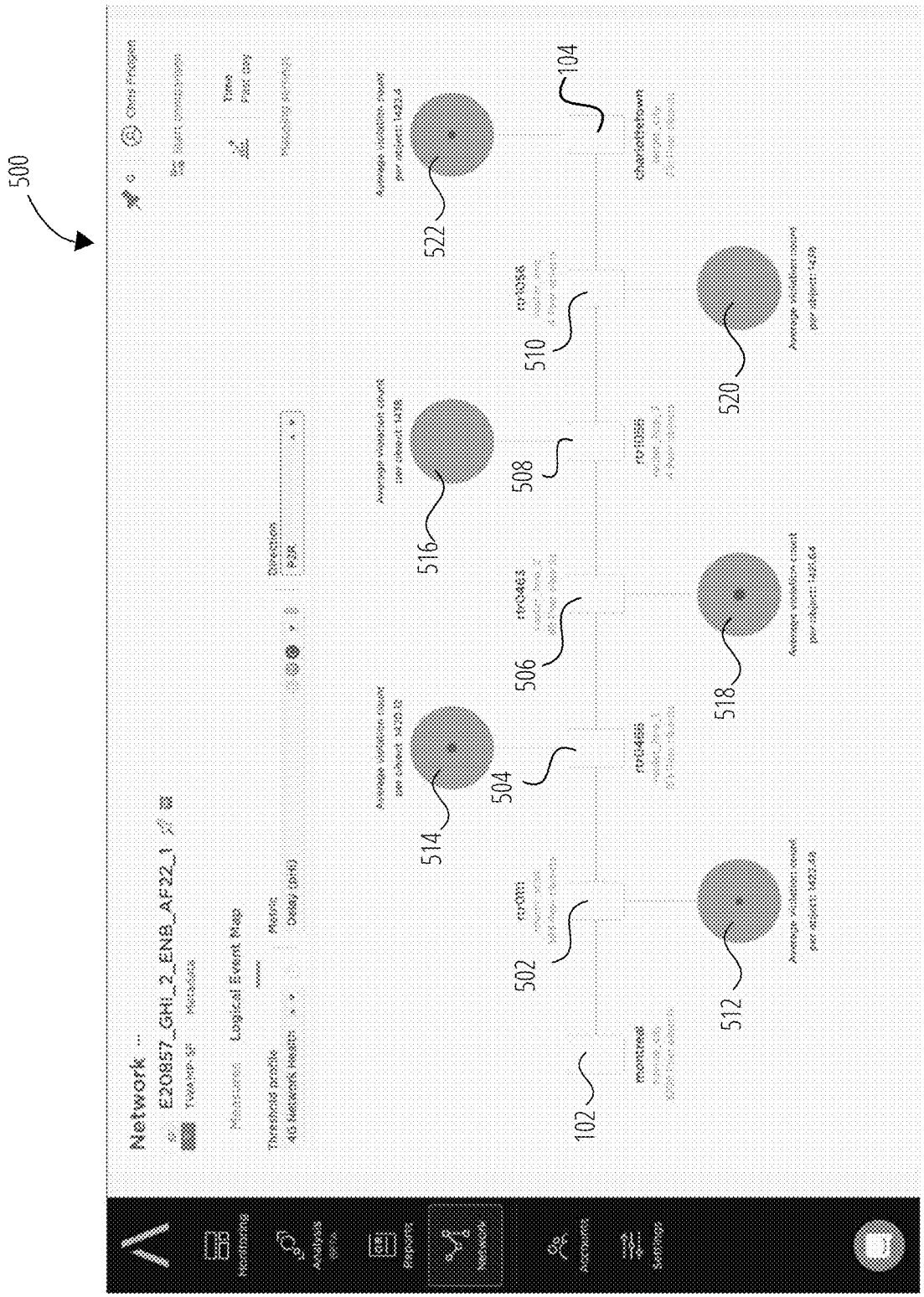
FIG. 5 illustrates a graphical user interface showing the event map.

FIG. 5 depicts an example of a logical event map of a network path going from a first network device 102 in Montreal to a second network device 104 in Charlottetown. The path goes through hop 1 502, hop 2 504, hop 3 506, hop 4 508 and hop 5 510. Topology metadata is associated with the different hops. Topology metadata can include, but not limited to:

Source/start/origin/probe
Source type (i.e. VCX, nano)
Destination/end/reflector
Endpoint type (i.e. router, eNB)
Geo coordinates (latitude and longitude) of your object or its origin and end points
Region or network segment
Customer
topology or path information (core and end router names)
Link type (fibre, microwave, etc. . . . )
Measurement type (telemetry, TWAMP, etc. . . . )
Class of service (COS)—Data, Voice, etc. . . . .
Equipment vendor
Config parameters
Department responsible for object performance In this embodiment, a bottom up investigative workflow is implemented based on the ability to start with a singular object that is experiencing a problem and step back to see if it's part of a bigger issue. The goal of logical event maps is to use an object's topology metadata to correlate across all the objects reporting into analytics with the same metadata tags, and point towards hot spots. For example, the logical even map can display the number of violations counts for each hops (512, 514, 516, 518, 520, 522). Users take a sampling of objects experiencing issues with a given topology point and investigate at a higher level to confirm whether the problems are truly correlated.

Analytics looks at all of the other monitored objects in the network that pass through a hop, it evaluates the total number of performance threshold breaches from those sessions, and plots concentric circles based on that volume of events and severity.

In another embodiment, the size and/or color of the violation count circles can vary to indicate the severity of the violations.

Figure 6:
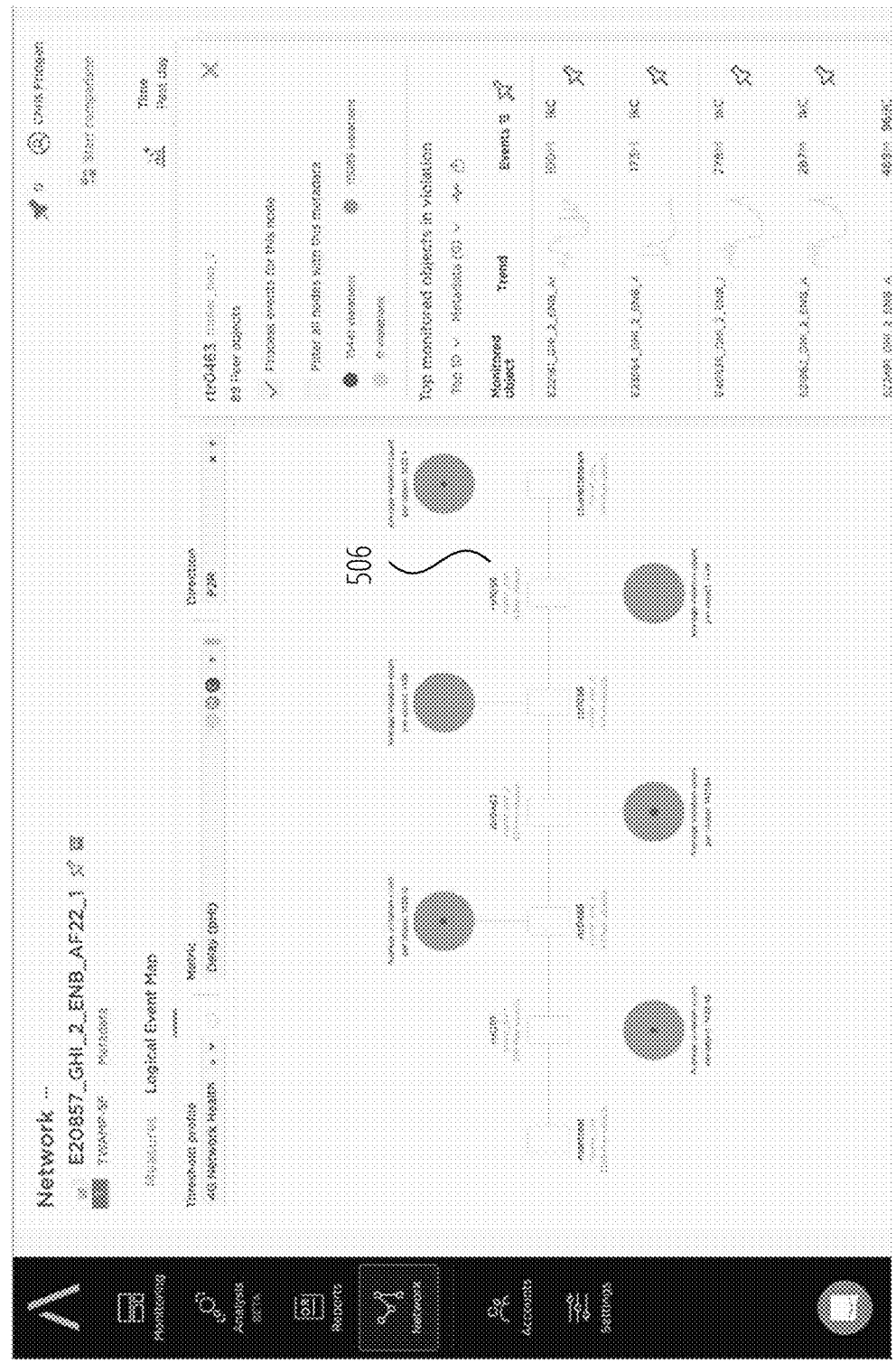
FIG. 6 illustrates information about the monitored objects.

FIG. 6 depicts how, in one embodiment, the logical event map narrows down on the performance of hop 3 506. The map displays all the monitored objects in violation. The data can be filtered based on metadata to narrow the results.

Figure 7:
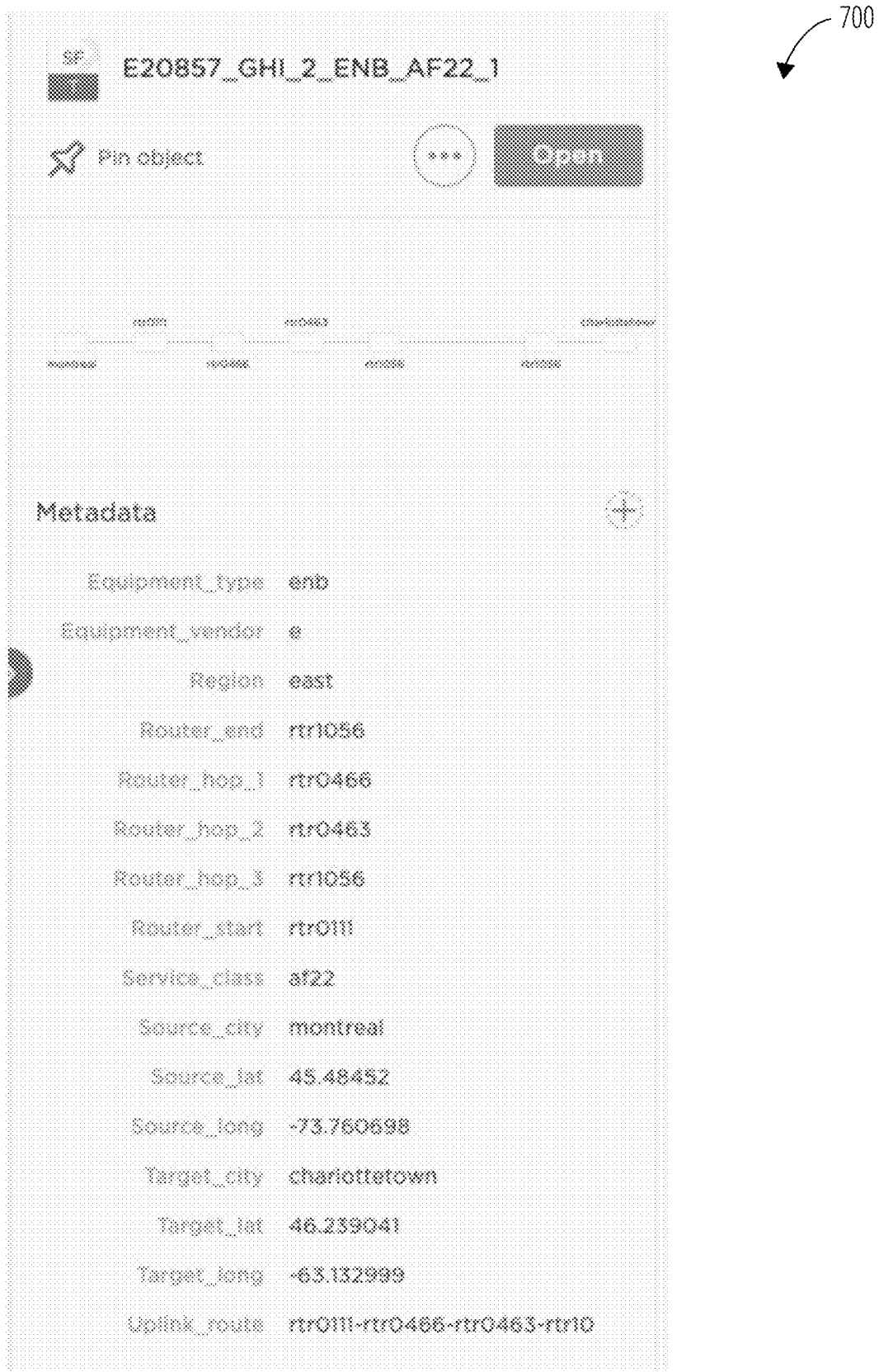
FIG. 7 illustrates a metadata 700 relating to a monitored object.

FIG. 7 depicts an example of metadata 700 associated with a monitored object and can contain the network path information.

Figure 8:
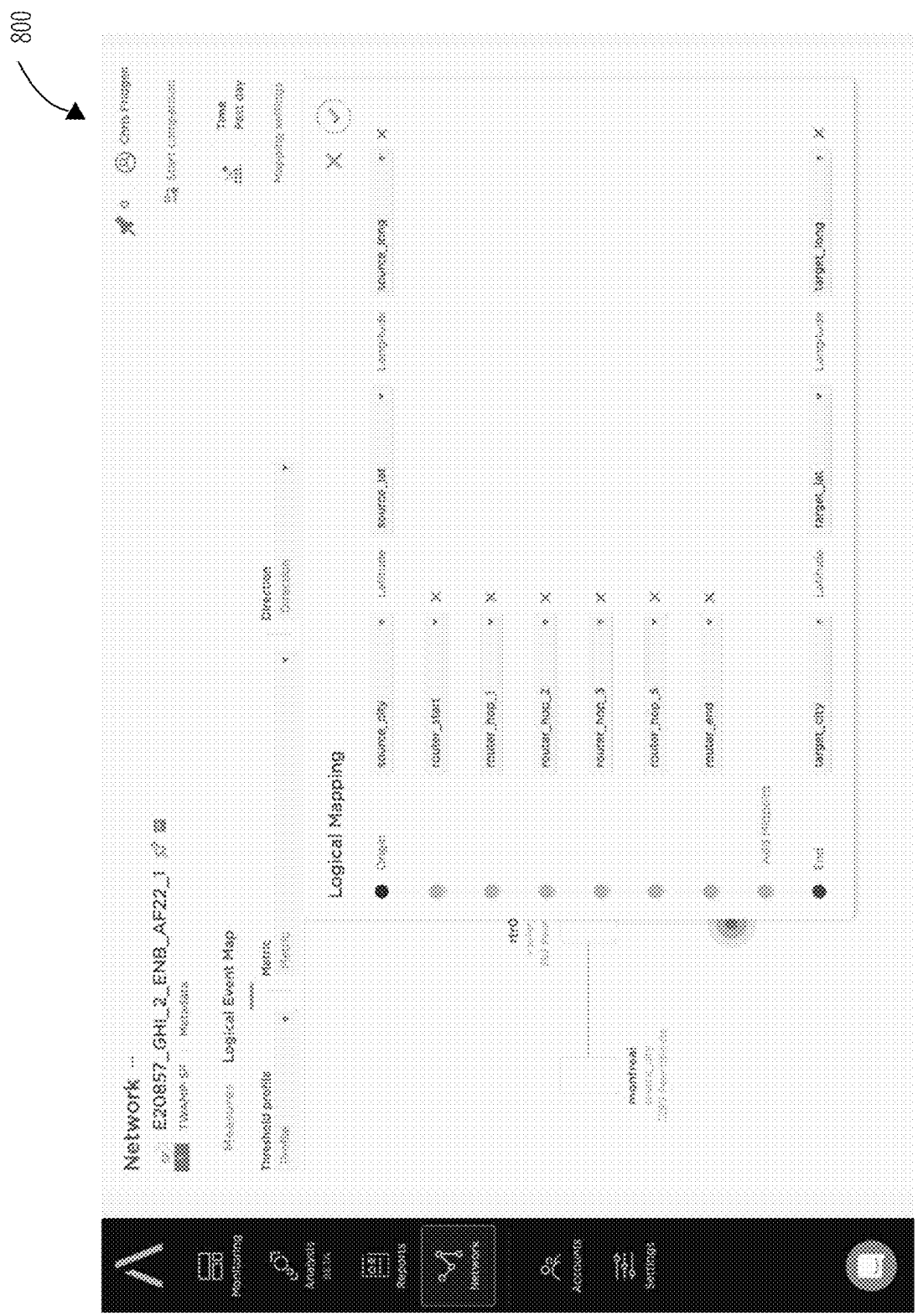
FIG. 8 illustrates logical mapping

FIG. 8 depicts an example of an embodiment, where the topology is a form or another type of metadata that administrators can manually add or integrate with an orchestration or inventory system to update programmatically. In this example the logical mapping is done based on the example shown in FIG. 5.

Once in the system, administrators can decide which metadata categories represent the flow of data.

Figure 9:
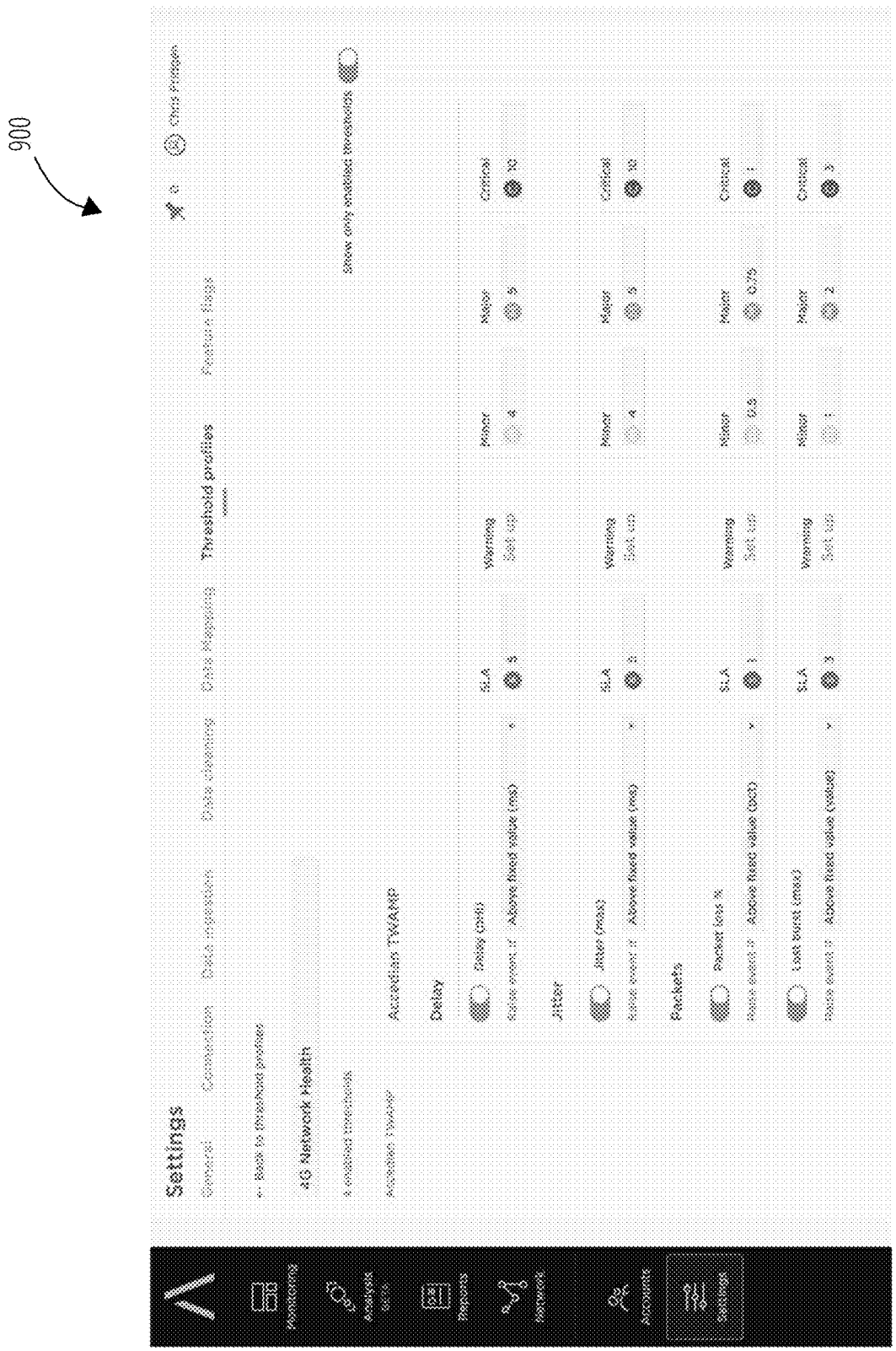
FIG. 9 illustrates threshold setting.

FIG. 9 depicts an example of a graphical user interface 900 for setting the system threshold values applied to different performance metrics. The threshold values are used to determine performance breaches or violations experienced by a monitored object.

Figure 10:
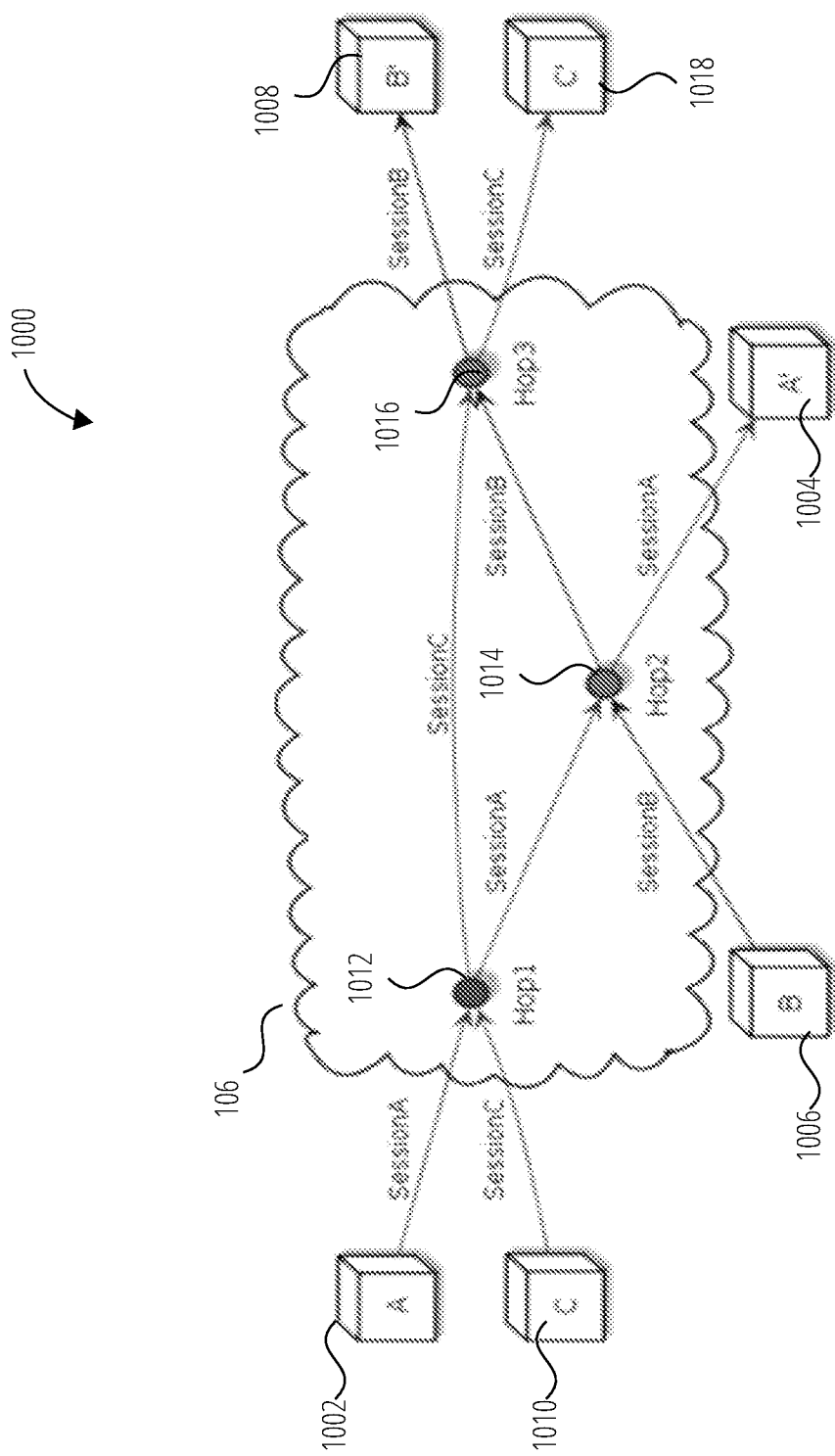
FIG. 10 illustrates a network with 3 paths.

FIG. 10 depicts an example with three network paths (or monitored objects) between:

1. Path A between device A 1002 and device A' 1004
2. Path B between device B 1006 and device B' 1008
3. Path C between device C 1010 and device C' 1018

The network 106 comprises three hops (1012, 1014 and 1016). The system uses correlation to indicate which segment of a path might be encountering issues. Assuming, for example, three performance tests (using test packets) are running across the network 106, on each of the above three paths and two paths, A and C, reporting bad performance results, while B is experiencing normal measurements. Statistically the system establishes that hop 1 1012 is an area of concern as more sessions with poor results pass through there. A total count of threshold breaches experienced by each node can be used to determine the significance.

Figure 11:
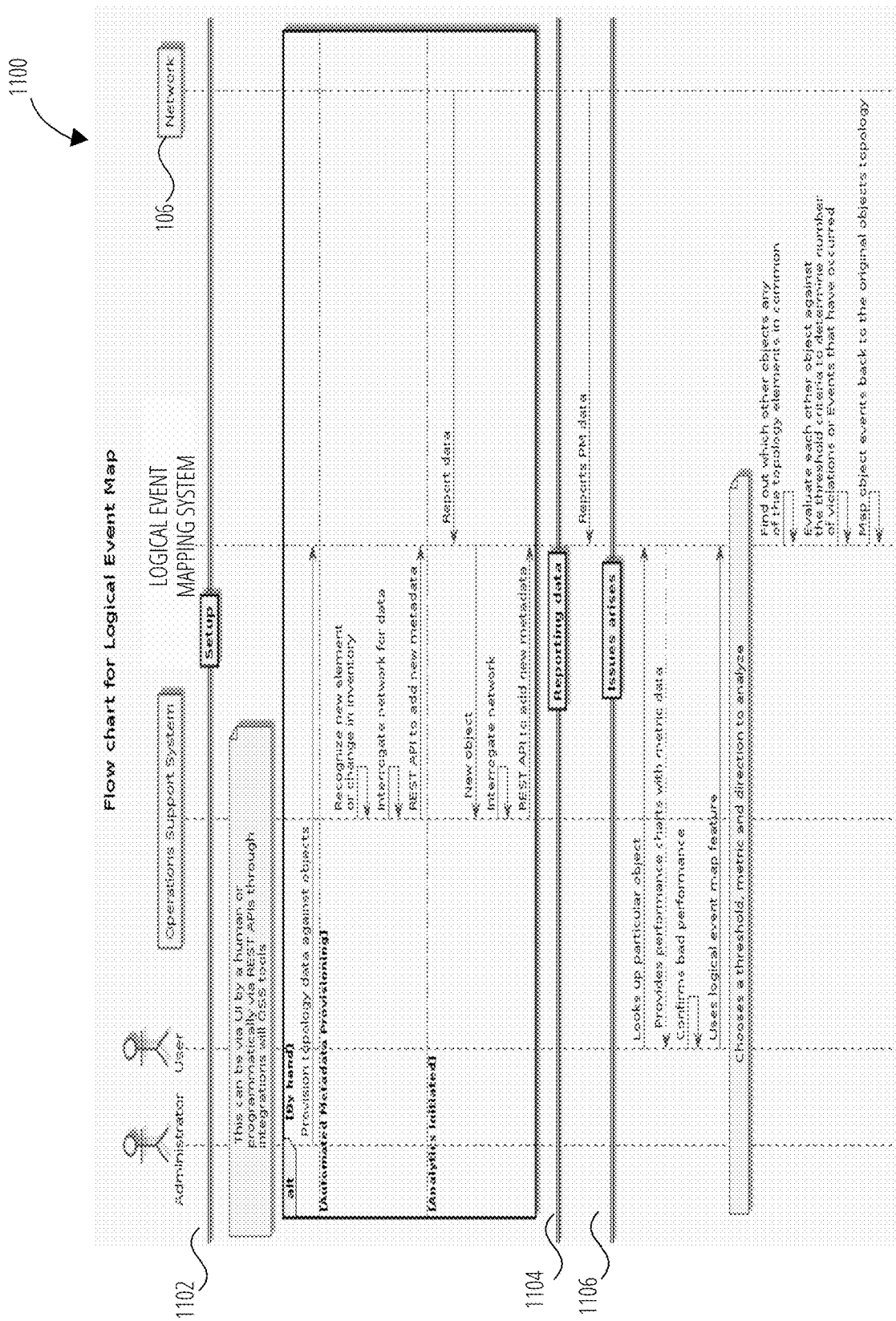
FIG. 11 illustrates a flow chart of the logical event mapping system.

FIG. 11 depicts a flow chart 1100 of an embodiment of the logical event mapping system. There are three modes. Set up mode 1102 where the metadata is provisioned, and the analytics are configured for each node in the network. The administrator provisions the topology data against monitored objects. New monitored objects or change in inventory in the network are recognized and the network is interrogated to obtain up to date data and the metadata is attached to the new objects.

The next mode 1104 is ongoing while each monitored object is repeatedly reporting performance monitoring data to the system.

When issues arise 1106 (e.g. performance threshold violation), the logical event map is updated to reflect the violation. The system extracts other monitored objects that share common hops. The system evaluates the performance of each monitored objects that share this hop to determine the number of threshold violation that have occurred and to update the logical event map.

Figure 12:
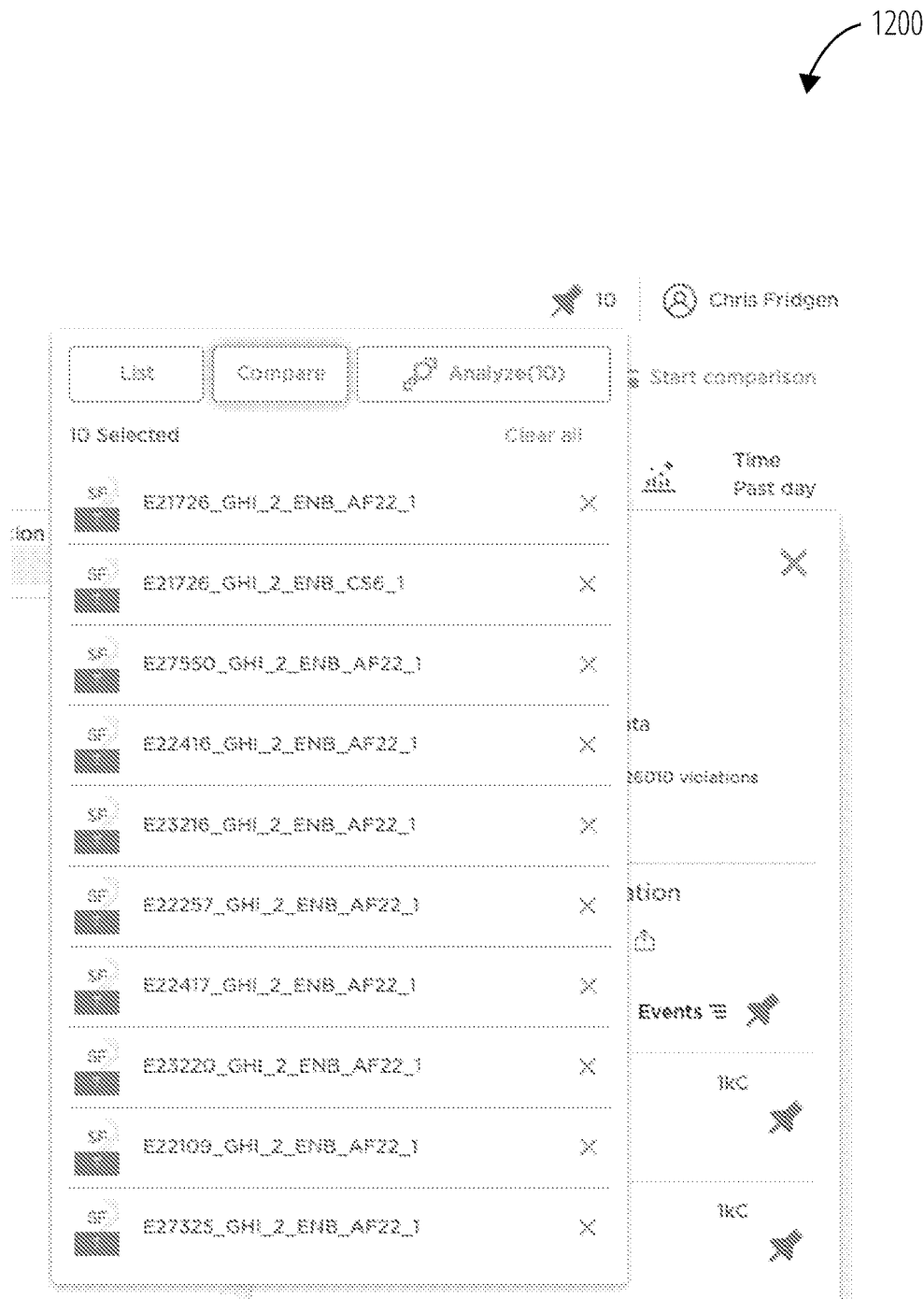
FIG. 12 illustrates monitored object selection interface.

FIG. 12 depicts an example 1200 of how the user can select other monitored objects to compare the performance at a given hop.

Figure 13:
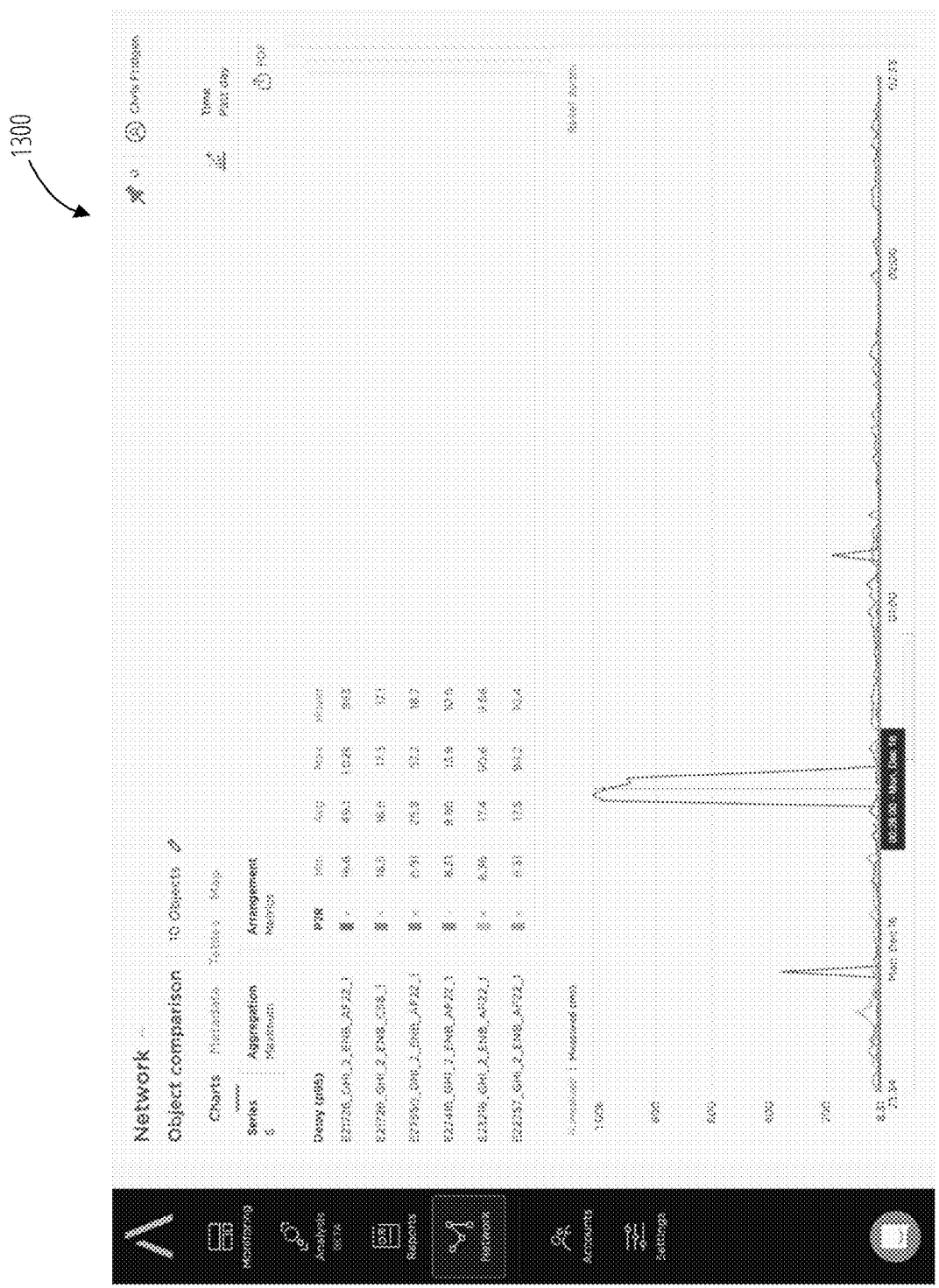
FIG. 13 illustrates an object performance comparison interface.

FIG. 13 depicts a visual representation 1300 of the performance of the paths sharing a specific hop.

Figure 14:
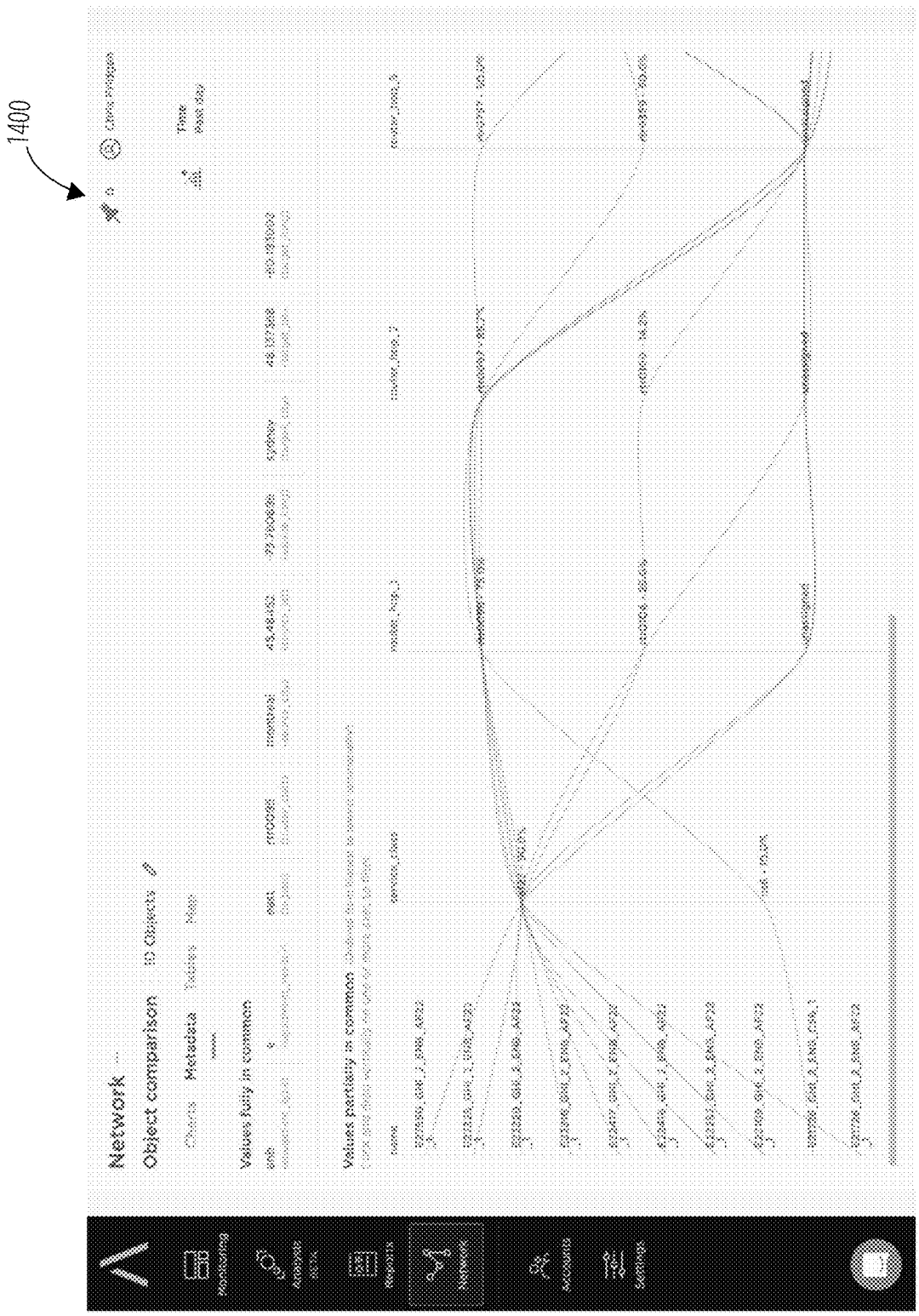
FIG. 14 illustrates an interface showing trends by metadata.

FIG. 14 shows another visual representation 1400 of the network where the user splits the results using metadata to look for trends.

Figure 15:
FIG. 15 illustrates a logical event map for monitored objects sharing similar metadata.

FIG. 15 shows another visual representation 1500 of the logical event map based on paths sharing similar metadata.

Figure 16:
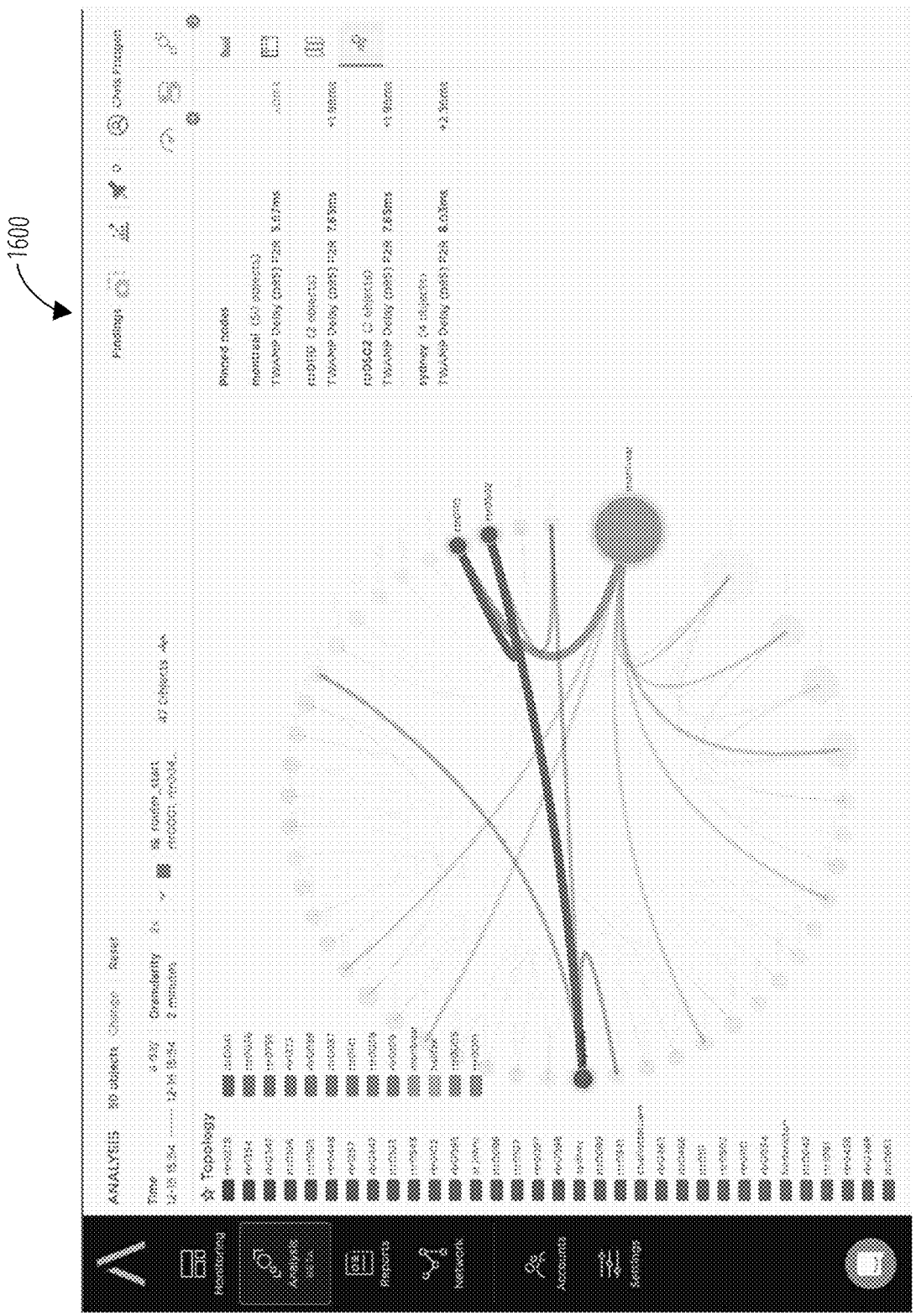
FIG. 16 illustrates topology insight diagram.

When investigating a performance issue, the user may be looking at a set of correlated objects (as per FIG. 16) that share a similar performance problem, and there is a need for help to know where the issue is located. Using topology information and graph analytics techniques, known in the art, to mesh object performance results together, a topology insight diagram 1600 can provide a picture of the statistical hop by hop cost of each element in the path. This gives the user a good sense of which elements to take a closer look at, where the circles identify performance problems at a given hop.

As another embodiment, the size and/or color of the circles can vary to identify the importance of the problem.

Figure 17:
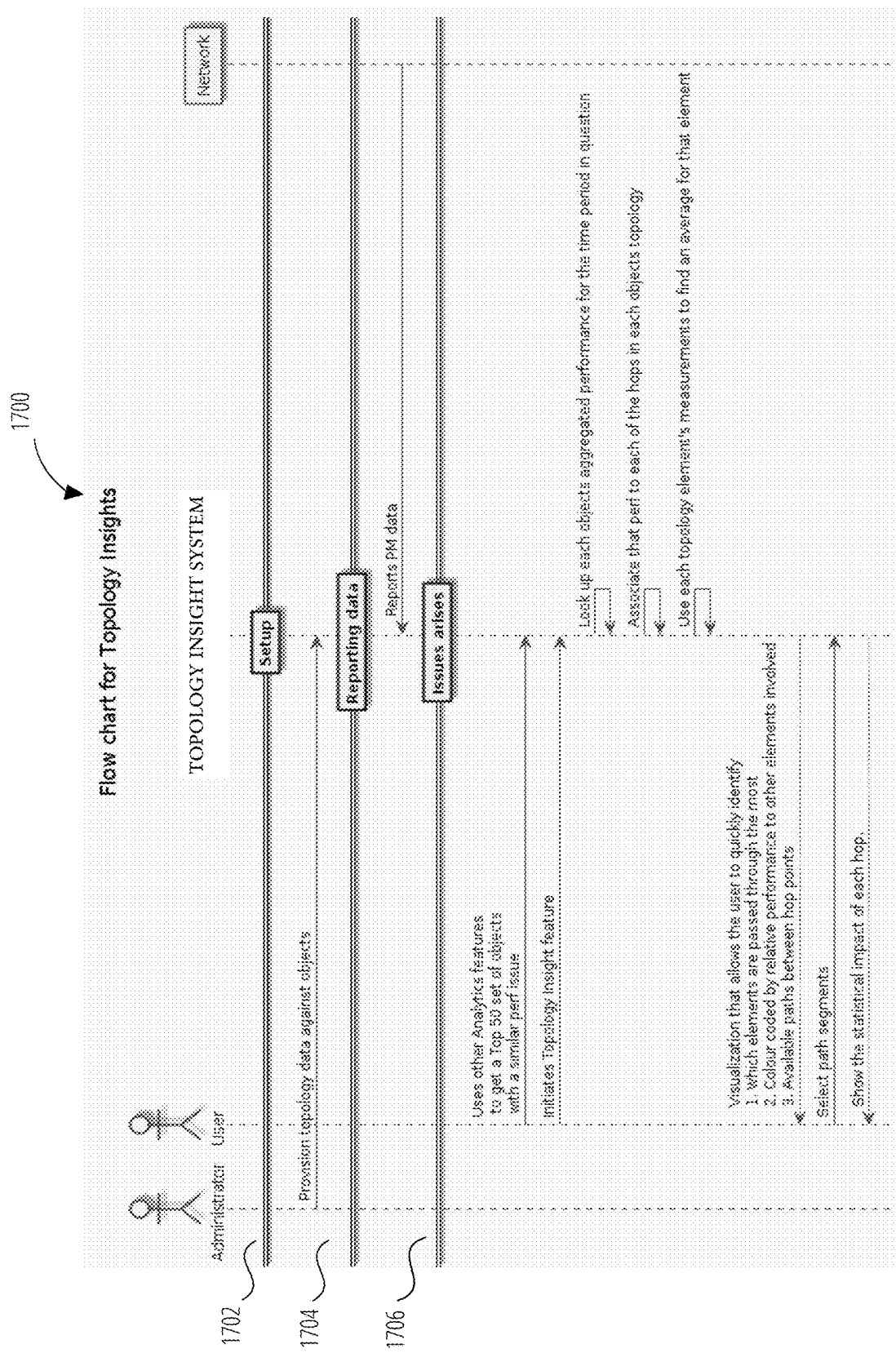
FIG. 17 illustrates a flow chart for the topology insight system.

FIG. 17 depicts an embodiment of the topology insight system that displays a topology insight diagram. Once the system is setup 1702, data reporting 1704 is done continuously on the network 106. When issues handling 1706 is required, the system uses analytics to extract a number (e.g. 50) of monitored object with similar performance issues. The aggregated performance of each object is looked up for the time period of the issue. The performance is associated to each of the monitored object topology and statistics (e.g. Average) are computed for that hop.

Based on these analytics, the user can visualize (FIG. 12) which hops are passed through the most, their relative performance and other paths available between the first and second network devices.

The statistical impact on the performance of each hop may optionally be displayed when one or more path segments is selected by the user.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random-access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (e.g., a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system for locating performance problems in a network comprising:
   a test module associating metadata, relating to any number of hops in the network, from test packets to a plurality of test sessions, each plurality of test sessions including at least one of the test packets going from one of a plurality of first devices in the network to one of a plurality of second devices in the network via one of a plurality of crossing tested paths, each one of the plurality of crossing tested paths including at least one of the hops in the network;
   a reflection module collecting the metadata relating to the hops in the network, and one or more performance threshold breaches of the crossing tested paths of said plurality of test sessions from only the plurality of second devices, and creating a correlation of said performance threshold breaches across the plurality of test sessions by matching the metadata relating to the hops;
   a computer display for displaying said correlation on a logical event map representing the tested paths, the hops and the first and second devices in the network, and a number of the performance threshold breaches involving each of the hops;
   wherein said correlation isolates the hops impacting said performance threshold breaches; and
   wherein the logical event map displays a number of violation counts for each hop in the any number of hops.

2. The system of claim 1 wherein the map plots a number of concentric circles around each of the hops based on the number of performance threshold breaches.

3. The system of claim 1 wherein said metadata comprises topology metadata selected from the group consisting of source, start, origin probe, Source type, destination, end, reflector, endpoint type, geocoordinates, region, network segment, customer, topology, path information, link type, measurement type, class of service and equipment vendor.

4. The system of claim 1, wherein the map plots a different size and/or color circle around each of the hops to indicate a severity of the performance threshold breaches.

5. The system of claim 1, wherein collecting the metadata relating to the hops, and the performance threshold breaches of the crossing tested paths comprises:
   transmitting at least one of the test packets to the reflection module;
   generating, at the reflection module, a reflection packet; and
   sending, from the reflection module to the test module, the reflection packet.

6. The system of claim 3, wherein said geocoordinates comprise a latitude and a longitude.

7. The system of claim 3, wherein said measurement type comprises TWAMP or telemetry.

* * * * *